United States Patent [19]

Zekulin et al.

[11] 4,063,457
[45] Dec. 20, 1977

[54] ULTRASONIC LEVEL SENSING DEVICE

[75] Inventors: Nikita Zekulin, Locust Valley; George L. Adams, Bayshore, both of N.Y.

[73] Assignee: Envirotech Corporation, Menlo Park, Calif.

[21] Appl. No.: 727,201

[22] Filed: Sept. 27, 1976

[51] Int. Cl.² .......................... G01F 23/28; G01S 9/66
[52] U.S. Cl. .................................. 73/290 V; 340/1 L
[58] Field of Search .................... 73/290 V, 194 A; 340/244 R, 1 L

[56] References Cited
U.S. PATENT DOCUMENTS

| | | | |
|---|---|---|---|
| 2,668,365 | 2/1954 | Hogin | 73/290 V X |
| 2,746,480 | 5/1956 | Hildyard | 73/290 V X |
| 2,883,861 | 4/1959 | Valkenburg et al. | 73/290 V |
| 3,010,318 | 11/1961 | Mongan | 73/290 V |
| 3,220,258 | 11/1965 | Rod | 73/290 V |
| 3,520,186 | 7/1970 | Adams et al. | 73/290 V |
| 3,748,635 | 7/1973 | Phillips et al. | 340/244 R X |
| 3,906,791 | 9/1975 | Lynnworth | 73/194 A |

*Primary Examiner*—Daniel M. Yasich
*Attorney, Agent, or Firm*—William S. Bernheim; Robert E. Krebs

[57] ABSTRACT

An ultrasonic sensing device for sensing the presence or absence of a liquid at various predetermined levels, especially in storage tanks, bilges and the like, employing multiple high frequency transducer assemblies having transmitting and receiving means enclosed in a sound conductive, e.g. metallic housing of special design minimizing "cross-talk" associated with means responsive to signals received above a selected minimum response level, the system being characterized by an on-off response provided by signal attenuation to a value less than said minimum response level in the absence of the liquid.

16 Claims, 6 Drawing Figures

ULTRASONIC LEVEL SENSING DEVICE

BACKGROUND

1. Field of the Invention

The invention relates to an apparatus for sensing the presence or absence of liquid at various predetermined levels within a vessel.

2. State of the Art

U.S. Pat. No. 3,520,186 teaches a single point sensing system employing a continuous signal and providing a simple on-off response. The system comprises means for continuously transmitting an ultrasonic signal from one piezoelectric transducer to another and means for amplifying any signals that have more than a certain critical amplitude at the time of reception. When gas occupies space between the transducers, transmitted signals do not reach the receiving transducer with sufficient strength to be amplified and, hence, detected.

A unitary structure for containing multiple sensing points of the above patent is not taught in the prior art. Interference between multiple sensing points as the result of receivers picking up signals from an incorrect transmitter or signals carried through the walls of the structure prevents simply joining a number of sensing points of the above patent in close proximity. Mounting a single sensing point of the above patent on a slideable member allows measurement at multiple level points but such moving parts introduce lubrication and wear problems. Misalignment and jamming of the moving parts are also a problem in applications such as in railroad tank cars in which the sensor is subjected to jousling and vibration.

OBJECT OF THE INVENTION

It is an object of this invention to provide a level detector for a sensing system which is tubular in construction, small in size, without moving parts, multiple in sensing levels and readily adaptable for insertion into a storage vessel in order to sense the presence or absence of a liquid therein at various predetermined levels.

It is a further object that the level detector dampen the wave motion of the liquid surface within the detector. Violent or even moderate wave motion of the sensing location is undesirable at it can cause the on-off response to flip-flop and reduces accuracy.

BRIEF DESCRIPTION OF THE DRAWINGS

The specification and the accompanying drawings show and describe a preferred embodiment of this invention, but it is to be understood that this embodiment is not intended to be exhaustive nor limiting of the invention, but on the contrary is given for the purpose of illustration in order that others skilled in the art may fully understand the invention and the principles thereof and the manner of applying it in practical use so that they may modify and adapt it in various forms, each as may be best suited to the conditions of a particular use. In the drawings.

DESCRIPTION OF THE PREFERRED EMBODIMENT

Figure 1:
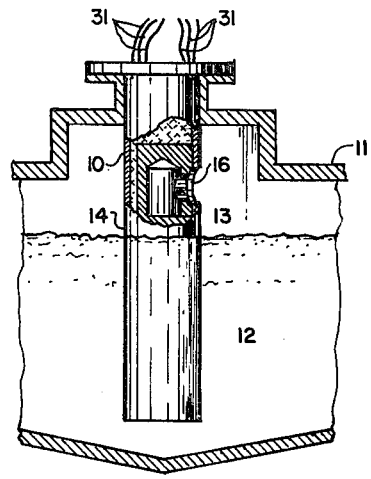
FIG. 1 is a side view of a level detector mounted in a tank according to the present invention with a portion of the detector's side removed to show its interior.

Referring to FIG. 1, a level detector 10 for a sensing system is mounted in a storage vessel 11 such as a bilge or railroad tank car. Contained within the storage vessel 11 is a body of liquid 12 and an overlying blanket 13 of gas such as air.

The level detector 10 includes an elongated tubular housing 14 which is preferably circular in cross section. The outside diameter of the housing is typically about seven-eighths inch or less, although larger diameters are entirely acceptable. The housing 14 is usually mounted to extend vertically into a liquid body with the housing 14 elongated to extend through the vertical elevations of measurement interest.

Figure 2:
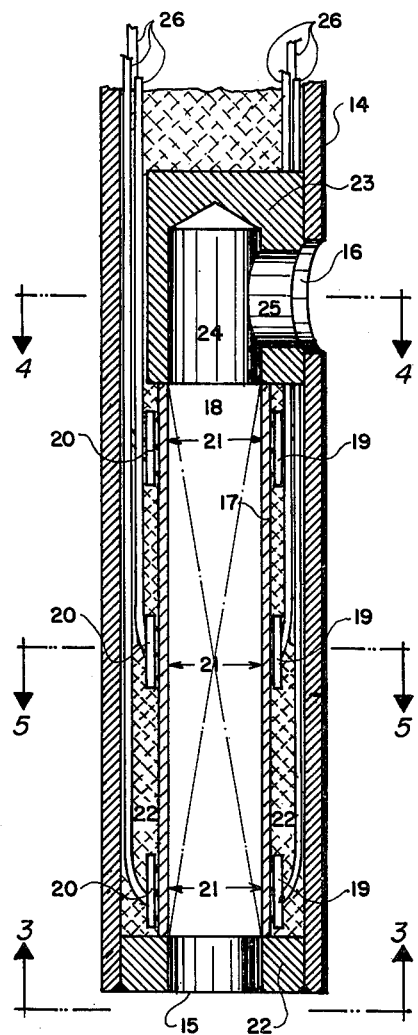
FIG. 2 is a sectional view of the detector of FIG. 1, enlarged for purposes of clarity.
Figure 3:
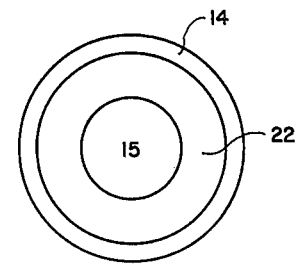
FIG. 3 is an end view of the device in FIG. 2 along line 3—3 in FIG. 2.
Figure 4:
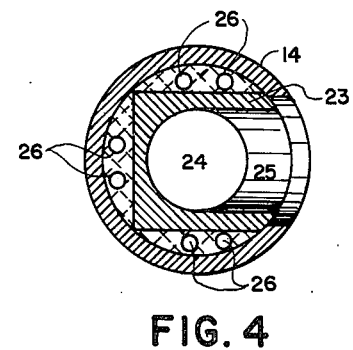
FIG. 4 is a cross section taken on line 4—4 of FIG. 2.

In the lower end of the housing 14 as shown in FIG. 2 is formed an inlet 15 to admit the liquid 12 to the interior of the housing. In the upper end of the housing is formed an outlet 16 for allowing gas to flow into and out of the housing 14 to equalize the pressure therein with that in the vessel 11 so that the level of the liquid 12 in the housing is the same as in the vessel 11. Fixedly mounted within and spaced from the tubular housing 14 is a tubular member 17, preferably of rectangular cross-section and more preferably of square cross section which defines within the housing 14 an interior passage 18 between the inlet 15 and the outlet 16. The small cross section of the interior passage in comparison to that of the vessel constricts the motion of the liquid resulting in a dampening effect within the housing. Between the walls of the inner tubular member 17 and the outer tubular housing 14 are mounted pairs of piezoelectric transducers serving as transmitters 19 and receivers 20. A typical number of pairs over a vertical elevation of interest of four feet is six.

The transmitters 19 are mounted to the member 17 at spaced apart intervals along the inner tube's length and are positioned to transmit ultrasonic signals transversely across the interior passage 18. Opposite and across the interior passage 18 are the receivers 20 each located to receive the ultrasonic signals from a transmitter 19 to which it is paired, the receivers 20 being also mounted to member 17 at spaced apart intervals along the length of member 17. Each such pair of a transmitter 19 and a receiver 20 provides a sensing point at which the presence or absence of the liquid is indicated. The transmitting and receiving transducers are interchangeable. The vertical spacing between adjacent edges of non-paired transducers is normally one-half inch or more.

Figure 5:
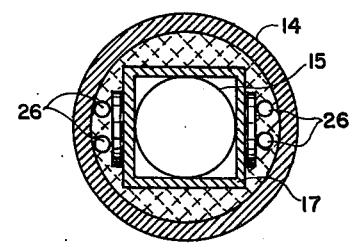
FIG. 5 is a cross section taken on line 5—5 of FIG. 2.

The member 17 is normally made of metallic material requiring certain structural configuration to prevent "cross-talk" i.e. the transmission of ultrasonic signals generated by the transmitters 19 by the metallic member 17 to the receivers 20. For this purpose and as seen in FIG. 5, the member 17 is designed such that each pair of a transmitter 19 and a receiver 20 are mounted on surfaces which are flat and parallel with respect to each other and not necessarily parallel as between different pairs, i.e. the opposed pairs may be staggered alternatively on different sides of the preferred square cross-section. The distance between the flat parallel surfaces of each pair which is filled by the liquid 12 when the liquid 12 reaches that level in the vessel, defines a sensing gap 21. A suitable gap 21 is between about ⅛ to 1 inch and preferably ⅜ to ½ inch.

The lower ends of housing 14 and member 17 are joined by an annular member 22 which seals the space between the walls of the inner and outer tubes from the liquid 12. The inner periphery of the annular member 22 defines the inlet 15. A plug 23, having two bores 24 and 25 formed therein which intersect each other, is positioned with the first bore 24 connecting to the interior passage 18 and the second bore 25 connecting in communication with outlet 16.

The transducers 19 and 20 are typically rectangular crystals ¼ by ⅛ inch in dimension and 30 thousandths of an inch in thickness and are mounted flat to the walls of the member 17. Coaxial cables 26 connect two wires to each crystal, one to each of the opposed faces of the crystal. With the wires, a voltage is established across the crystals used as transmitters 19 to produce a continuous vibration yielding ultrasonic signals normal to the faces to cross the sensing gaps 21. If gas 13 fills the sensing gap 21 of a particular transmitter 19 the ultrasonic signals are attenuated to a strength which is insufficient to induce a voltage at the receiving transducer 20 in excess of the predetermined minimum response level. On the other hand, if liquid fills the sensing gap 21 of a particular transmitter 19, the ultrasonic signals cross the gap 21 and vibrate the receiver 20 paired to the particular transmitter 19 to induce voltage above the predetermined minimum response level.

The coaxial cables 26 pass up the housing 14 between the walls of the housing 14 and member 17 around the plug 23 and out of the detector 10 to connect to remotely located components of the sensing system including a means for detecting the signal received and, usually a means for amplifying the received signal prior to detection. Suitable components for these purposes are described in the aforementioned U.S. Pat. No. 3,520,186. The cables 26 can be held in position by filling the space between the walls of the housing 14 and member 17 with a filler such as silicon rubber.

The paired transmitters 19 and receivers 20 are normally disposed to provide a straight line signal path therebetween which signal path when intersecting the liquid interface does so at angles of 0° to 60°.

Crystals having frequencies of 2 megacycles, up to 4 megacycles or more preferably about 3.7 megacycles are suitable transducers for detecting liquid-gas interfaces. Higher frequencies in the order of 10–15 megacycles can be suitable if the detector 19 is used to detect liquid-liquid interfaces since the device may be designed such that one of the liquids will act like a gas and completely attenuate the signal below the response level. Suitable crystals are generally of the piezoelectric type such as barium titanate, lead zirconate and lead metaniobate crystals.

Figure 6:
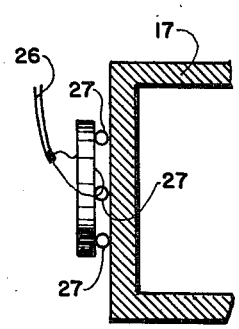
FIG. 6 is an enlarged view of a portion of the structure shown in FIG. 5.

To help avoid cross talk the crystals are acoustically isolated except in the signal path and the ratio of wet-to-dry signal i.e. presence or absence of liquid in the sensing gap is maximized. To acoustically isolate the crystal a substance through which the radial mode of vibration of the crystal will not be transmitted such as plastic or ceramic material is placed around the crystal except between the crystal and the member 17. Preferably, as seen in FIG. 6, the crystal is seated on a number of rubber feet 27 and then adhered in position with a thin layer of a conventional epoxy resin.

When the member 17 is made of non-metallic material such as a plastic or other poor sonic signal conductor it is unnecessary for the transducers to be mounted on flat parallel surfaces of the inner sheath and a circular cross-section is preferred for the member 17 for structural strength.

We claim:

1. A level detector for a sensing system in which the level detector is mounted to extend into a vessel for detecting the presence of liquid at a plurality of levels in the vessel comprising:
   a. an elongated tubular housing including an inlet means at its lower end to admit a liquid to the interior of said housing, and an outlet means at its upper end for allowing gas to flow into and out of said tubular housing to equalize the pressure therein with that in the vessel;
   b. a tubular member made of a material and having a cross-sectional configuration to prevent cross talk and mounted within said tubular housing and spaced therefrom, said tubular member having a means for sealingly connecting said tubular housing and said tubular member, at said outlet means and defining within said tubular housing an interior passage between said inlet means and said outlet means so as to admit liquid to the interior passage to the same level as the liquid is in the vessel;
   c. a plurality of means for transmitting an ultrasonic signal at the plurality of levels, said means of said plurality being mounted between said tubular housing and said tubular member at spaced apart vertical intervals along said tubular member and positioned so as to transmit ultrasonic signals transversely across the interior passage;
   d. a plurality of second means for receiving the ultrasonic signals at the plurality of levels, each of said second means of said plurality being mounted between said tubular housing and said tubular member at spaced apart vertical intervals along said tubular member opposite, across and paired with a corresponding one of said transmitter means; each of said paired transmitter means and second receiver means providing a signal path therebetween across the interior passage.

2. The level detector of claim 1 wherein the signal paths within the interior passage are between about ⅛ to 1 inch.

3. The level detector of claim 1 wherein each of said paired transmitter means and receiver means is mounted to said tubular member on surfaces of said tubular member which are flat and parallel with respect to each other.

4. The level detector of claim 3 wherein the cross section of said tubular member perpendicular to the elongated direction of said tubular housing at locations at which said paired transmitter means and receiving means are mounted is rectangular.

5. The level detector of claim 4 wherein the cross section is square and the signal paths within the interior passage are between about ⅛ to 1 inch.

6. The level detector of claim 5 wherein the cross section of said tubular housing perpendicular to the elongated direction of said tubular housing between said inlet means and said outlet means is circular.

7. The level detector of claim 6 wherein said transmitter means and second receiver means include a crystal having a frequency of between 2 and 4 megacycles and the signal paths within the interior passage are between about ⅛ to 1 inch.

8. The level detector of claim 7 wherein the signal paths within the interior passage are between about ⅜ to ½ inch.

9. A level detector for a sensing system in which the level detector is mounted to extend into a vessel for detecting the presence or absence of liquid at a plurality of levels in the vessel comprising:
 a. an elongated tubular housing including an inlet means below the plurality of levels to admit a liquid to the interior of said housing, and an outlet means above the plurality of levels for allowing gas to flow into and out of said housing to equalize the pressure therein with that in the vessel;
 b. a tubular member elongated in substantially the same direction as said tubular housing is elongated, made of a material and having a cross-sectional configuration to prevent cross talk and mounted within said tubular housing and spaced therefrom, said tubular member having a means for sealingly connecting said tubular housing and said tubular member, at said outlet means and defining within said tubular housing an interior passage between said inlet means and said outlet means so as to admit liquid to the interior passage to the same level as the liquid is in the vessel;
 c. a plurality of means for transmitting an ultrasonic signal at the plurality of levels, said transmitter means of said plurality being mounted between said tubular housing and said tubular member at spaced apart vertical intervals along said tubular member and positioned so as to transmit ultrasonic signals transversely across the interior passage;
 d. a plurality of second means for receiving the ultrasonic signals at the plurality of levels, said second receiver means of said plurality being mounted between said tubular housing and said tubular member at spaced apart vertical intervals along said tubular member opposite, across the interior passage and paired with a corresponding one of said transmitter means; each of said paired transmitter means and second receiver means providing a signal path therebetween across the interior passage.

10. The level detector of claim 9 wherein the signal paths within the interior passage are between about $\frac{1}{8}$ to 1 inch.

11. The level detector of claim 9 wherein each of said paired transmitter means and receiver means is mounted to said tubular member on surfaces of said tubular member which are flat and parallel with respect to each other and said paired transmitter means and receiver means do not penetrate the interior passage.

12. The level detector of claim 11 wherein the cross section of said tubular member perpendicular to the elongated direction of said tubular housing at locations at which said paired transmitter means and receiver means are mounted is rectangular.

13. The level detector of claim 12 wherein the cross section is square and the signal paths within the interior passage are between about $\frac{1}{8}$ to 1 inch.

14. The level detector of claim 13 wherein the cross section of said tubular housing perpendicular to the elongated direction of said tubular housing between said inlet means and said outlet means is circular.

15. The level detector of claim 14 wherein said transmitter means and second receiver means include a crystal having a frequency of between 2 and 4 megacycles and the signal paths within the interior passage are between about $\frac{1}{8}$ to 1 inch and intersect the liquid interface at an angle of 0 to 60°.

16. The level detector of claim 15 wherein the signal paths within the interior passage are between about $\frac{3}{8}$ to $\frac{1}{2}$ inch.